United States Patent
Clingerman et al.

(10) Patent No.: US 6,959,249 B2
(45) Date of Patent: Oct. 25, 2005

(54) LOAD FOLLOWING ALGORITHM FOR A FUEL CELL BASED SYSTEM

(75) Inventors: Bruce Jeffrey Clingerman, Palmyra, NY (US); Kiran Mallavarapu, Honeoye Falls, NY (US); Akbar Chowdhury, Pittsford, NY (US)

(73) Assignee: General Motors Corporation, Detroit, MI (US)

( * ) Notice: Subject to any disclaimer, the term of this patent is extended or adjusted under 35 U.S.C. 154(b) by 40 days.

(21) Appl. No.: 10/725,680

(22) Filed: Dec. 2, 2003

(65) Prior Publication Data

US 2005/0119842 A1 Jun. 2, 2005

(51) Int. Cl.$^7$ .............................................. G06F 19/00
(52) U.S. Cl. ............................ 702/60; 702/57; 702/63; 702/64; 702/65
(58) Field of Search ............................ 702/57, 60, 63, 702/64, 65, 190, 191; 429/13, 17, 19, 22, 23, 34; 180/65.3, 65.8; 701/22

(56) References Cited

U.S. PATENT DOCUMENTS

| | | | |
|---|---|---|---|
| 6,792,341 B2 * | 9/2004 | Hunt et al. | 701/22 |
| 2004/0083039 A1 * | 4/2004 | Hunt et al. | 701/22 |
| 2004/0175598 A1 * | 9/2004 | Bliven et al. | 429/12 |
| 2004/0253489 A1 * | 12/2004 | Horgan et al. | 429/13 |

\* cited by examiner

*Primary Examiner*—Bryan Bui
(74) *Attorney, Agent, or Firm*—Cary W. Brooks

(57) ABSTRACT

A fuel cell generation system employing a load following algorithm that provides the desired output power from the fuel cell on demand. The system includes a draw current sensor that measures the current drawn from the fuel cell used to satisfy the system load demands. The load following algorithm uses the measured draw current to identify the proper amount of fuel and air to meet the load demands, and then provides a buffer of extra fuel and air to the fuel cell so if the load demand suddenly increases, the fuel cell is able to immediately produce the extra output power. As the current drawn from the fuel cell changes in response to changing load demands, the load following algorithm causes the amount of fuel and air being applied to the fuel cell stack to increase and decrease so that the buffer of extra fuel and air is maintained substantially constant.

22 Claims, 3 Drawing Sheets

LOAD FOLLOWING ALGORITHM FOR A FUEL CELL BASED SYSTEM

BACKGROUND OF THE INVENTION

1. Field of the Invention

This invention relates generally to a fuel cell based system employing a load following algorithm and, more particularly, to a fuel cell based system that employs a load following algorithm, where the system includes a current sensor for measuring the current drawn from the fuel cell, and where the load following algorithm selectively controls the fuel and air applied to the fuel cell so that a predetermined amount of extra fuel and air is applied to the fuel cell to satisfy sudden increases in power demand.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines. Hydrogen fuel cells can also be a clean and efficient energy supply for stationary power, referred to as distributed generation.

A hydrogen fuel cell is an electro-chemical device that includes an anode and a cathode with an electrolyte therebetween. The anode receives hydrogen gas as a fuel and the cathode receives oxygen or air. The hydrogen gas is disassociated in the anode to generate free hydrogen protons and electrons. The hydrogen protons pass through the electrolyte to the cathode where they react with the oxygen and the electrons in the cathode to generate water. The electrons disassociated in the anode cannot pass through the electrolyte, and thus are directed through a load to perform work before being sent to the cathode.

Proton exchange membrane fuel cells (PEMFC) are a known popular fuel cell. The PEMFC generally includes a solid polymer electrolyte proton conducting membrane, such as a perfluorosulfonic acid membrane. The anode and the cathode typically include finely divided catalytic particles, usually platinum (Pt), supported on carbon particles and mixed with an ionomer. The combination of the anode, cathode and membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Typically, a system employing a fuel cell for generating power includes a fuel cell distributed generation (FCDG) system that generates a conditioned direct current (DC) or alternating current (AC) to provide the desired power requirements for a particular application. The FCDG system provides the amount of power based on the demand from the system loads at a particular point in time. For an automotive application, the vehicle operator presses the power pedal to generate more vehicle speed, which requires more output power from the fuel cell. The power request is made to the powertrain of the vehicle. The additional power to increase the vehicle speed is not provided to the powertrain until it is being produced and is available from the fuel cell. Thus, it takes a certain amount of time from the time that the operator presses the power pedal until the desired amount of power is provided by the fuel cell. Sometimes this time period is on the order of 500 milliseconds.

In other applications, such as home power generation applications, the FCDG system will draw all the power it needs immediately from the fuel cell, possibly drawing more power than the fuel cell is able to provide from its current fuel and air input. For example, a user may flip a switch to start an appliance where the added power demand is necessary almost instantaneously. When this happens, the power draw from the fuel cell could damage the fuel cell by attempting to draw more current than the fuel cell is capable of delivering at that moment in time. Thus, known FCDG systems employ an additional power source, such as a battery, in parallel with the fuel cell to meet the additional power requirements during the transient time between when the power request is made and the fuel cell begins generating the additional power.

An FCDG system can employ a load following algorithm that conditions and provides the desired amount of output power virtually instantaneously to satisfy the loads as they are connected and disconnected to and from the FCDG system. To do this, the load following algorithm manages the dual power sources of the battery and the fuel cell to reject and control the disturbances imposed on the fuel cell by the changing loads.

FIG. 1 is a general schematic block diagram of an FCDG system 10. The system 10 includes a fuel cell 12 that generates output power based on the principles discussed above. The system 10 also includes a storage battery 14 that provides additional power during start-up and at those times that the fuel cell 12 is not providing enough power to operate certain distributed generation (DG) loads 24. The system 10 also includes a power conditioning module 18 that includes DC/DC converters and DC/AC inverters for converting the DC power from the fuel cell 12 to DC power of various voltage levels and the DC power from the fuel cell 12 to AC power for the loads 24.

The fuel cell 12 provides variable DC power on output line 16 to the power conditioning module 18 depending on the fuel and air input to the fuel cell 12. Likewise, the battery 14 provides DC power on line 20 to the power conditioning module 18, such as for example, 60 kilowatts DC power. The power conditioning module 18 includes the appropriate circuitry to condition the DC power to different DC power levels and to AC power. The AC power is provided on line 22 to operate the various DG loads 24 depending on the particular application. The DG loads 24 can switch on and off at any time, resulting in less or more power draw from the fuel cell 12.

The power conditioning module 18 provides conditioned DC power on line 26 for certain devices in the fuel cell 12, such as 380 volts for a system compressor that provides the cathode input air. The power conditioning module 18 also provides conditioned DC power on line 28 to the fuel cell 12 at a lower voltage level than the line 26, such as 12 and/or 42 volts, to operate other fuel cell components, such as low power ancillary components. The power conditioning module 18 also provides DC power on line 30 to charge the battery 14 during those times that the fuel cell 12 is providing more power than is required by the DG loads 24.

Certain constraints are imposed on the control system operating the system 10. Particularly, current drawn on the line 16 from the fuel cell 12 (I_fuelcell) should not exceed the current available from the fuel cell stack (I_maxFC). Further, the rate of change of the flow of current from the fuel cell 12 is limited as a result of gas flow dynamics.

Testing, durability concerns and system components collectively define the flow dynamics. For this disclosure, the flow dynamic is limited to:

$$\frac{d(\text{I\_fuelcell})}{dt} \leq 25 \text{ (amps/s)} \quad (1)$$

Additionally, the battery output voltage should be maintained between 62 V and 70 V. Battery current during charging has to be limited to avoid battery boil off, i.e., I_batt≧10 amps into the battery. Also, the fuel cell voltage has to be maintained within a certain percentage of its polarization curve. The fuel cell diagnostics would shut the system down if these parameters were violated to protect the fuel cell from irreversible damage.

As discussed above, FCDG systems can employ load following or load balancing algorithms to power balance the primary load, the compressor load and the low power ancillary loads with the power generator by the fuel cell 12. If the power on the lines 16, 20, 22, 26, 28 and 30 can be accurately measured by suitable sensors and the efficiency of the power conditioning module 18 is accurately known, then the power balance can be expressed as:

$$\eta = \frac{P_{cmp} + P_{anc} + P_{load}}{P_{fuelcell} + P_{batt}} \quad (2)$$

In equation (2), $P_{cmp}$ is the compressor power on the line 26, $P_{anc}$ is the ancillary power on the line 28, $P_{load}$ is the AC load on the line 22, $P_{fuelcell}$ is the power provided by the fuel cell 12 on the line 16, $P_{batt}$ is the power on the line 20 from the battery 14, and η is the overall efficiency of the power conditioning module 18.

Thus, if the efficiency η is known and all the power is measured in the FCDG system by current and voltage sensors, then $P_{fuelcell}$ can be calculated. However, if any of the power measurements are underestimated, the power requirement can cause the battery 14 to be drained over a period of time. On the other hand, if the sensors overestimate the power measurements, the system 10 will operate inefficiently. In addition to being able to accurately measure the currents discussed herein, such a scheme would require at least ten voltage and current sensors, and a fully developed efficiency map over the entire operating range of the system 10. Thus, such a technique may be very fault intolerant, costly and inefficient.

Fuel cell stoichiometry or lambda defines the amount of fuel and air that is necessary to generate a particular output current from the fuel cell. Particularly, the fuel lambda, also called anode stoichiometry, is the moles per second of hydrogen delivered to the fuel cell stack divided by the moles per second of hydrogen consumed by the fuel cell stack. Likewise, the oxygen lambda is the moles per second of oxygen delivered to the fuel cell stack divided by the moles per second of oxygen consumed by the stack. If the fuel cell stack operated perfectly, then the fuel lambda and the oxygen lambda would be one. However, because the fuel and oxygen do not reach all of the catalyst evenly and perfectly in the stack, more fuel and oxygen is required to provide a particular output current, and thus the fuel lambda and the oxygen lambda are necessarily greater than one.

SUMMARY OF THE INVENTION

In accordance with the teachings of the present invention, a fuel cell generation system is disclosed that employs a load following algorithm that provides the desired output power from the fuel cell on demand. The system includes a draw current sensor that measures the current drawn from the fuel cell used to satisfy the system load demands. The load following algorithm uses the measured draw current to identify the proper amount of fuel and air to be applied to the stack to meet the load demands, and then provides a buffer of extra fuel and air within the fuel cell stack so if the load demands suddenly increase, the fuel cell is able to immediately produce the extra output power. As the current drawn from the fuel cell changes in response to changing load demands, the load following algorithm causes the amount of fuel and air being applied to the fuel cell stack to increase and decrease so that the buffer of extra fuel and air is maintained substantially constant. This extra fuel and air is unconsumed, and may be exhausted from the fuel cell stack. For efficiency, certain mechanizations circulate the gases back into the stack rather than exhaust them from the system.

In one embodiment, the load following algorithm filters the measured draw current by a first order lag filter so that noise from the sensor is filtered out, but transients from the system load are not. The filtered draw current is then averaged by a sliding mean over a predetermined number of sample periods so that rapid transients in the load demand do not overwhelm the system components. The averaged draw current is then added to a buffer current to generate a command current set point that results in the extra fuel and air. The command signal is applied to the fuel cell stack to generate the desired amount of current for the particular system loads.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell based generation system employing a load following algorithm is merely exemplary in nature, and is in no way intended to limit the invention or its applications or uses.

Figure 2:
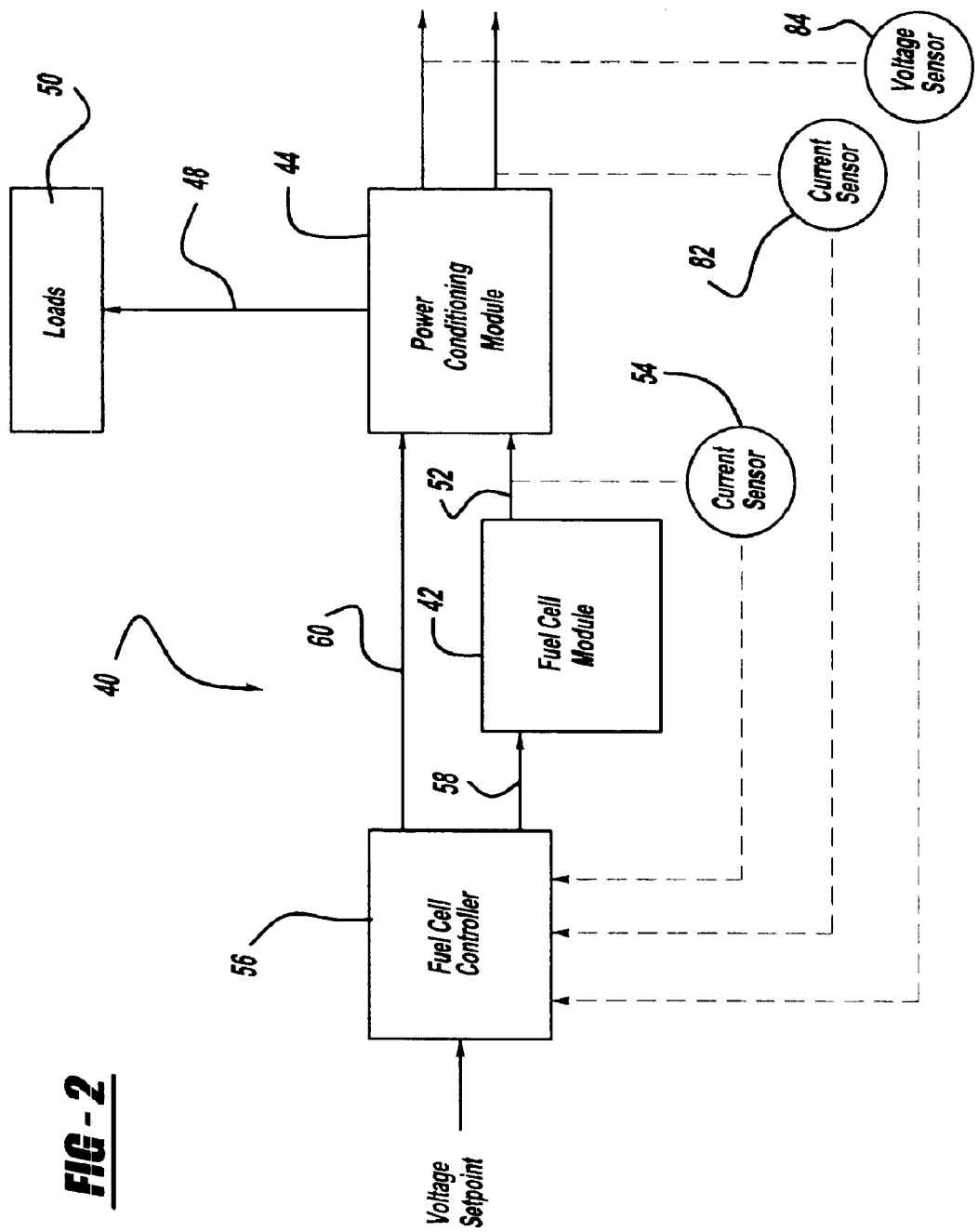
FIG. 2 is a fuel cell based generation system employing a load following algorithm, according to an embodiment of the present invention.

FIG. 2 is a schematic block diagram of a fuel cell based system 40, according to an embodiment of the present invention. The system 40 includes a fuel cell module 42 having a fuel cell stack for providing output current to drive a particular load. The system 40 also includes a power conditioning module 44 similar to the power conditioning module 18 that includes DC/DC converters and DC/AC inverters. In this design, a system battery is included in the power conditioning module 44 that provides the additional power that the system 40 may be required to deliver before the fuel cell module 42 has had an opportunity to ramp up during increased power demands. The battery may not be necessary for certain applications.

The power conditioning module 44 provides AC power on an output line 48 applied to various AC loads 50 that the system 40 is driving. In one embodiment, the system 40 is employed in a vehicle for providing power to drive the vehicle. However, as will be appreciated by those skilled in the art, the system 40 can be employed in any suitable full cell system, such as a home or business power generation system.

According to the invention, the system 40 includes a current draw sensor 54 that measures the draw current I_fuelcell from the fuel cell module 42 on line 52 being drawn by the power conditioning module 44 to satisfy the demands of the loads 50. The current sensor 54 provides a signal to a fuel cell controller 56 indicative of the measured draw current I_fuelcell. The fuel cell controller 56 determines the maximum draw current I_maxFC available to be drawn from the fuel cell module 42. The controller 56 also provides a command I_reqFC to the fuel cell module 42 on line 58 that instructs the fuel cell module 42 to generate a certain amount of power based on a load following algorithm discussed below. In other words, the command I_reqFC determines the amount of fuel and air that should be provided to the fuel cell module 42 based in part on the current power demands of the loads 50. The power conditioning module 44 determines the fuel and air, since it takes into account whether the battery needs charging. As will be discussed in detail below, the command I_reqFC causes a buffer of extra fuel and air to be applied to the fuel cell module 42 to satisfy transients in the demand from the loads 50.

The current controller 56 also provides a current draw signal I_draw to the power conditioning module 44 on line 60, where the controller 56 sets the current draw signal I_draw to the maximum draw current I_maxFC. Thus, the power conditioning module 44 knows to only draw as much current from the fuel cell module 42 as the fuel cell module 42 is currently able to produce, and knows to take any further power demanded by the loads 50 from the battery.

According to the present invention, the load following algorithm uses the measured draw current to identify the proper amount of fuel and air to meet the load demand for the fuel cell lambdas of the system 40. Additionally, the load following algorithm determines the necessary amount of extra fuel and air that is applied to the fuel cell module 42 to provide a buffer of extra available output current in the event that the demand from the loads 50 suddenly increases. In other words, the load following algorithm of the present invention provides an additional amount of fuel and air to the fuel cell module 42 above that which is necessary to meet the current power demands from the loads 50 so that the fuel cell module 42 is able to immediately provide additional output power upon request from the loads 50. The extra fuel and air can be part of the fuel and oxygen lambda, or in addition to the oxygen and fuel lambda. This extra fuel and air is exhausted from the fuel cell module 42 as unused fuel and air, or can be routed back to the input of the fuel cell module 42 in certain designs.

Figure 3:
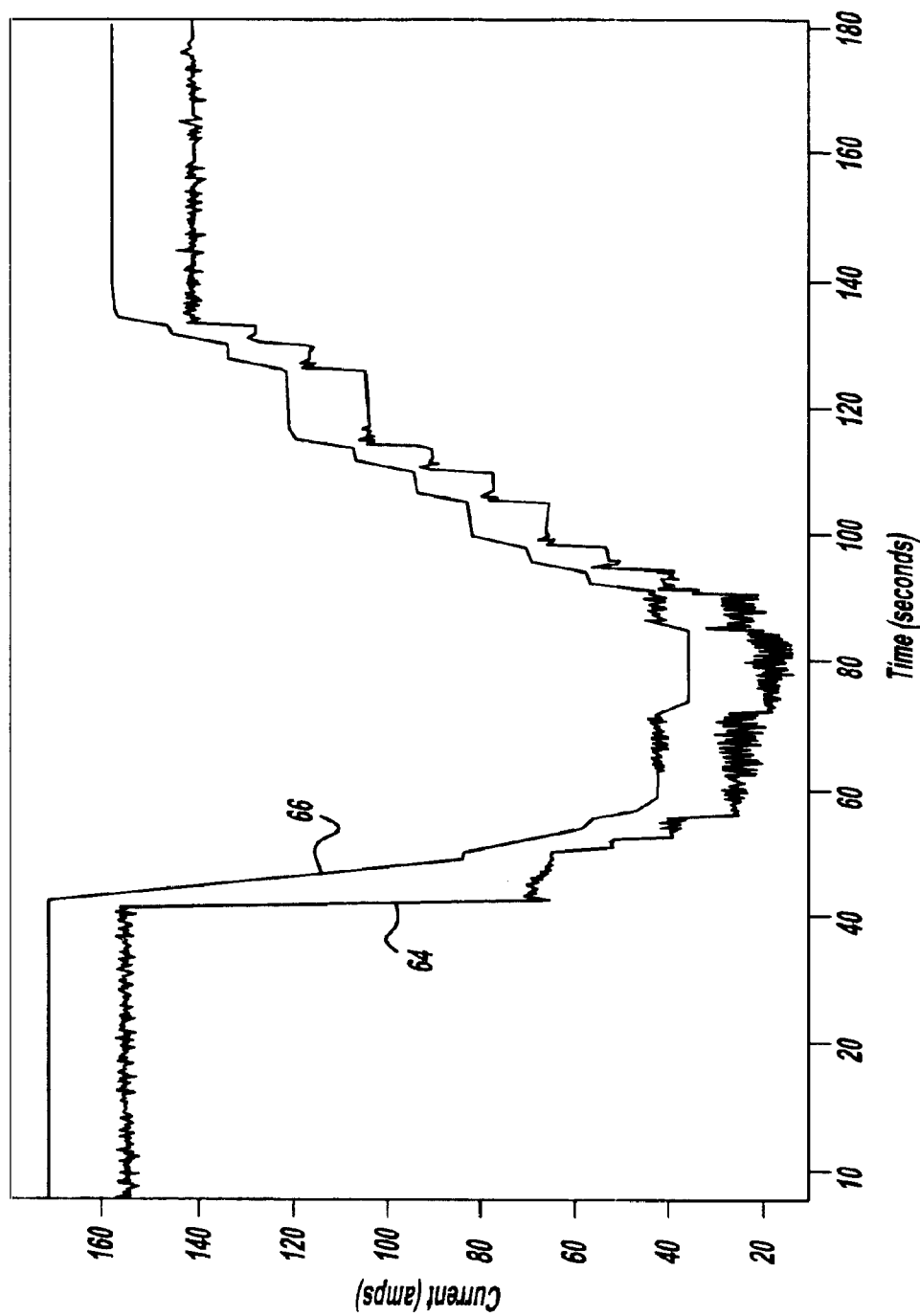
FIG. 3 is a graph with time on the horizontal axis and current on the vertical axis showing the operations of load following algorithm of the invention.

FIG. 3 is a graph with time on the horizontal axis and current on the vertical axis showing a graphical depiction of the operation of the load following algorithm. Graph line 64 represents the draw current I_fuelcell drawn by the power conditioning module 44 to satisfy the loads 50 at any particular point in time. Graph line 66 represents the current that the fuel cell module 42 is able to produce at any point in time based on its fuel and air input. As is apparent, the graph line 66 is always greater than the graph line 64 so that transients (spikes) from the loads 50 can be provided virtually instantaneously. As the demands of the load go up and down, the current available from the fuel cell module 42 also goes up and down.

Figure 1:
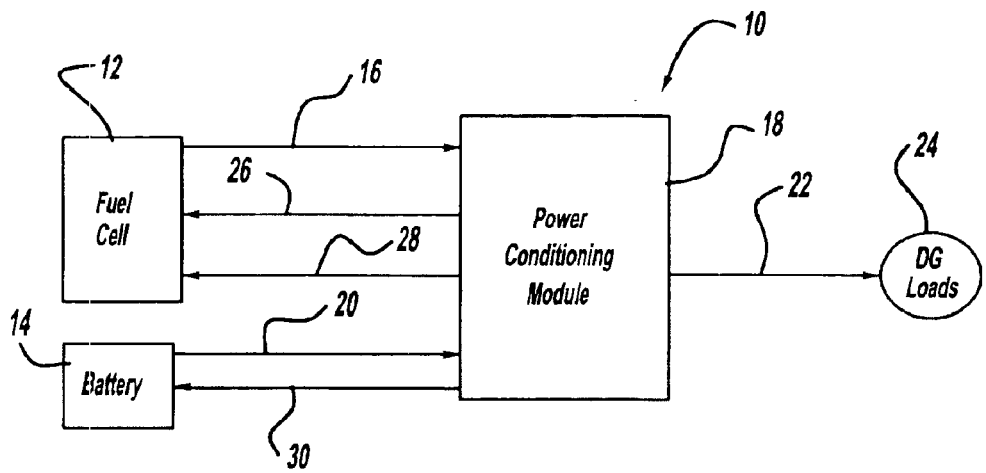
FIG. 1 is a representative schematic block diagram of a fuel cell based generation system.
Figure 4:
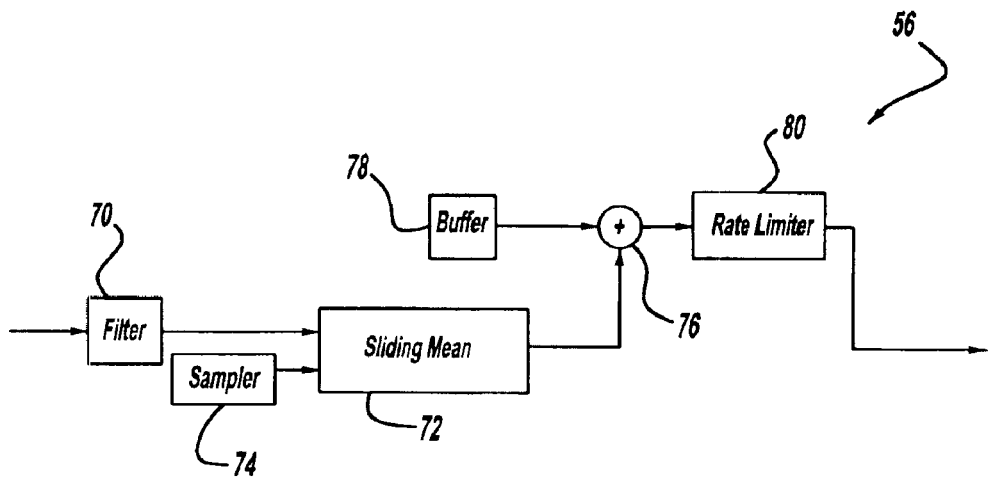
FIG. 4 is a block diagram showing operational steps performed by the load following algorithm of the system depicted in FIG. 2.

FIG. 4 is a block diagram showing the operation of the load following algorithm, according to the invention. The measured draw current from the sensor 54 is applied to a first order lag filter 70 that filters out the noise in the signal from the operation of the sensor 54, but does not filter out changes in the measured draw current as a result of the transients. The filter 70 thus prevents changes in the input fuel and air as a result of sensor noise. Therefore, current sensor oscillations are not transmitted to the input fuel and air flows to the fuel cell module 42, thus avoiding undesirable pulsing in the system 40. The filter 70 needs to be calibrated to reduce sensor noise, but still allow the load following algorithm to react to the transients fast enough to meet system performance needs. The filter 70 can be any filter suitable for the purposes discussed herein, such as a Kalman filter, Butterworth filter, notch filter, etc.

The filtered current signal from the filter 70 is applied to a sliding mean 72. Additionally, a sample signal from a sampler 74 is applied to the sliding mean 72. The sliding mean 72 generates an average of the filtered current signal over a certain number of samples, where a most recent sample replaces the oldest sample at each sample period. The sliding mean 72 prevents large changes to the draw current I_fuelcell from overwhelming the system 40, and prevents overshooting the desired buffer of air and fuel. The number of samples is determined by a calibration based on the particular parameters of the fuel cell system 40 and the loads 50, such as typical load transients and fuel cell system dynamics. In one embodiment, the samples are generated every 10 ms and the number of samples that are averaged is twenty.

The averaged current signal from the sliding mean 72 is applied to a summer 76. Additionally, a buffer current signal from a buffer 78 is applied to the summer 76. The buffer signal adds a predetermined amount of current to the averaged current signal from the sliding mean 72 to provide the extra fuel and air flow to the fuel cell module 42 to accommodate the transients discussed above. The buffer size is determined by a calibration for the particular system, including expected changes in the draw current I_fuelcell, the speed of the valve actuators, size of the system plumbing, etc.

The added signal from the summer 76 is applied to a rate limiter 80 that defines the rate of increase or decrease of the fuel and air input to the fuel cell module 42. This is desirable so that the changes in the fuel and air input are tuned to the dynamic capability of the fuel cell module 42. In other words, this ramp rate is based on the compressor speed, valve actuator speed, pipe size, etc of the system 40. The output of the rate limiter 80 is the command I_reqFC applied to the fuel cell module 42.

As discussed above, a control loop ensures that the draw current I_fuelcell is maintained below the maximum draw current I_maxFC. However, if the sensor 54 has significant noise, the maximum draw current I_maxFC may be less than the draw current I_fuelcell. In this situation the battery current is used to satisfy the load demands if the battery is part of the system 40. However, if this situation is not detected and the output of the fuel cell module 42 is not increased, the battery may be eventually drained. According to the invention, this situation is prevented by providing a battery current sensor 82 that senses the battery current I_batt, and provides a signal indicative of the battery current I_batt to the fuel cell controller 56. If the battery current I_batt is persistently positive based on predetermined parameters, battery power is being continually used, and the algorithm is not preventing the draw current I_fuelcell to be below the maximum draw current I_maxFC. If this occurs, the command I_reqFC is ramped up to ensure that the battery is not drained.

Further, the battery voltage may drift over time. In order to accommodate drifts in the battery voltage, the system 40 includes a voltage sensor 84 to measure the voltage of the battery. The sensed battery voltage is applied to the fuel cell controller 56 to control the current draw signal I_draw. The controller 56 compares the measured battery voltage to a voltage set point to determine the voltage drift. The measured battery voltage keeps the charge current of the battery below a predetermined value, such as 10 amps. The controller 56 can provide an increase in the command I_reqFC to charge the battery. However, the increase is limited so that the charge current does not exceed 10 amps.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell distribution system for controlling power applied to a system load, said system comprising:
    a fuel cell for generating a draw current, said fuel cell being responsive to a fuel input and an air input;
    a power conditioning module responsive to the draw current, said power conditioning module conditioning the draw current and applying a conditioned current to the system load;
    a fuel cell sensor for measuring the draw current from the fuel cell, said fuel cell sensor generating a fuel cell signal indicative of the measured draw current; and
    a fuel cell controller responsive to the fuel cell signal, said fuel cell controller operating a load following algorithm that generates a command signal applied to the fuel cell for determining available output power from the fuel cell, said load following algorithm providing a buffer of fuel input and air input to the fuel cell so that the fuel cell is able to immediately generate additional current above the draw current in response to transients from the system load.

2. The system according to claim 1 wherein the fuel cell controller includes a filter for filtering noise in the fuel cell signal.

3. The system according to claim 2 wherein the filter is a first order lag filter that limits filtering of the transients in the fuel cell signal.

4. The system according to claim 2 wherein the filter is selected from the group consisting of Kalman filters, Butterworth filters and notch filters.

5. The system according to claim 1 wherein the load following algorithm averages the fuel cell signal over a predetermined number of sample periods.

6. The system according to claim 5 wherein the averaged fuel cell signal is combined with a buffer signal to provide the extra fuel input and air input.

7. The system according to claim 1 wherein the fuel cell controller includes a rate limiter for limiting the rate at which the fuel input and the air input are applied to the fuel cell.

8. The system according to claim 1 further comprising a battery and a battery current sensor or battery model, said battery providing battery current for the system load and said battery current sensor or battery model measuring the battery current, said battery current sensor generating a battery current signal indicative of the measured battery current.

9. The system according to claim 8 wherein the fuel cell controller is responsive to the battery current signal, said fuel cell controller increasing the available output power if the battery sensor measures a predetermined battery current continuously for a predetermined period of time.

10. The system according to claim 1 further comprising a battery and a battery voltage sensor, said battery providing battery voltage for the system load and said battery voltage sensor measuring the battery voltage, said battery voltage sensor generating a battery voltage signal indicative of the measured battery voltage.

11. The system according to claim 10 wherein the fuel cell controller is responsive to the battery voltage signal, said fuel cell controller monitoring battery voltage drift and determining a charge current applied to the battery.

12. The system according to claim 1 wherein the system provides power to a vehicle.

13. A fuel cell distribution system for controlling power applied to a system load, said system comprising:
    a fuel cell for generating a draw current, said fuel cell being responsive to a fuel input and an air input;
    a power conditioning module responsive to the draw current, said power conditioning module conditioning the draw current and applying a conditioned current to the system load;
    a fuel cell sensor for measuring the draw current from the fuel cell, said fuel cell sensor generating a fuel cell signal indicative of the measured draw current; and
    a fuel cell controller responsive to the fuel cell signal, said fuel cell controller operating a load following algorithm that provides a command signal applied to the fuel cell for determining available output power from the fuel cell, said load following algorithm providing a buffer of fuel input and air input to the fuel cell so that the fuel cell is able to immediately generate additional current above the draw current in response to transients from the system load, said load fuel cell controller including a first order lag filter for filtering noise in the fuel cell signal and limiting filtering of the transients in the fuel cell signal, said load following algorithm averaging the filtered fuel cell signal over a predetermined number of sample periods, wherein the averaged fuel cell signal is combined with a buffer signal to provide the extra fuel input and air input.

14. The system according to claim 13 wherein the filter is selected from the group consisting of Kalman filters, Butterworth filters and notch filters.

15. The system according to claim 13 wherein the fuel cell controller includes a rate limiter for limiting the rate at which the fuel input and the air input are applied to the fuel cell.

16. The system according to claim 13 further comprising a battery and a battery current sensor, said battery providing battery current for the system load and said battery current sensor measuring the battery current, said battery current sensor generating a battery current signal indicative of the measured battery current, wherein the fuel cell controller is responsive to the battery current signal, said fuel cell controller increasing the available output power if the battery sensor measures a predetermined battery current continuously for a predetermined period of time.

17. The system according to claim 13 further comprising a battery and a battery voltage sensor, said battery providing battery voltage for the system load and said battery voltage sensor measuring the battery voltage, said battery voltage sensor generating a battery voltage signal indicative of the measured battery voltage, wherein the fuel cell controller is responsive to the battery voltage signal, said fuel cell controller monitoring battery voltage drift and determining a charge current applied to the battery.

18. A method for distributing power from a fuel cell to a load, said method comprising:

applying fuel to the fuel cell;

applying air to the fuel cell;

drawing current from the fuel cell to a power conditioning module;

conditioning the draw current in the power conditioning module;

applying the conditioned draw current to the load;

measuring the draw current from the fuel cell; and providing a command signal to the fuel cell that sets the fuel and air to the fuel cell and determines available output power from the fuel cell, said command signal providing a predetermined extra amount of fuel and air to the fuel cell so that the fuel cell is able to generate additional output power immediately in response to an increased demand from the load.

19. The method according to claim 18 further comprising filtering the measured draw current by a first order lag filter.

20. The method according to claim 18 further comprising averaging the measured draw current over a predetermined number of sample periods.

21. The method according to claim 18 further comprising measuring battery current from a battery, and increasing the available output power if the measured battery current is continuously above a predetermined amount for a predetermined period of time.

22. The method according to claim 18 further comprising measuring battery voltage from a battery and a battery voltage sensor, and monitoring battery voltage drift.

* * * * *